US012640134B2

(12) United States Patent
Park

(10) Patent No.: US 12,640,134 B2
(45) Date of Patent: May 26, 2026

(54) REFRIGERATOR DRIVEN BASED ON AMBIENT NOISE AND CONTROL METHOD THEREOF

(71) Applicant: SAMSUNG ELECTRONICS CO., LTD., Suwon-si (KR)

(72) Inventor: Jungwon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 18/589,005

(22) Filed: Feb. 27, 2024

(65) Prior Publication Data

US 2024/0194176 A1 Jun. 13, 2024

Related U.S. Application Data

(63) Continuation of application No. PCT/KR2023/018858, filed on Nov. 22, 2023.

(30) Foreign Application Priority Data

Nov. 23, 2022 (KR) ........................ 10-2022-0158175

(51) Int. Cl.

| | |
|---|---|
| ***G10K 11/16*** | (2006.01) |
| ***F25B 49/02*** | (2006.01) |
| ***G10K 11/178*** | (2006.01) |

(52) U.S. Cl.

CPC ........ *G10K 11/17873* (2018.01); *F25B 49/02* (2013.01); *G10K 11/17823* (2018.01); *F25B 2500/12* (2013.01); *G10K 2210/1054* (2013.01)

(58) Field of Classification Search

CPC ....... G10K 11/17873; G10K 11/17823; G10K 2210/1054; F25B 49/02; F25B 2500/12

(Continued)

(56) References Cited

U.S. PATENT DOCUMENTS

| | | | |
|---|---|---|---|
| 9,470,451 | B2 | 10/2016 | Kim et al. |
| 10,088,225 | B2 | 10/2018 | Kim et al. |

(Continued)

FOREIGN PATENT DOCUMENTS

| | | | | |
|---|---|---|---|---|
| JP | 2019-52807 A | | 4/2019 | |
| JP | 2019052807 A | * | 4/2019 | ........... F25D 29/005 |

(Continued)

OTHER PUBLICATIONS

International Search Report (PCT/ISA/210) issued Mar. 7, 2024 by the International Searching Authority in International Patent Application No. PCT/KR2023/018858.

(Continued)

*Primary Examiner* — Ammar T Hamid

(74) *Attorney, Agent, or Firm* — Sughrue Mion, PLLC

(57) ABSTRACT

A refrigerator includes a microphone and at least one processor configured to identify a first driving noise level corresponding to first driving state information of the refrigerator, based on receiving an ambient noise through the microphone while operating according to the first driving state information, identify a reception noise level based on the received ambient noise, identify an external noise level based on the reception noise level and the first driving noise level, and based on a ratio of the external noise level to the first driving noise level being smaller than a threshold ratio, drive the refrigerator based on second driving state information corresponding to a lower noise level than the first driving state information.

20 Claims, 15 Drawing Sheets

(58) Field of Classification Search
USPC ................................................ 381/71.3, 71.1
See application file for complete search history.

(56) References Cited

U.S. PATENT DOCUMENTS

| | | | |
|---|---|---|---|
| 11,355,105 | B2 | 6/2022 | Lee |
| 11,551,687 | B2 | 1/2023 | Hwang et al. |
| 11,587,545 | B2 | 2/2023 | Lee et al. |
| 11,614,278 | B2 | 3/2023 | Han et al. |
| 2013/0167565 | A1 | 7/2013 | Kim et al. |
| 2020/0096253 | A1 | 3/2020 | Han et al. |

FOREIGN PATENT DOCUMENTS

| | | | | | |
|---|---|---|---|---|---|
| JP | 6986912 | B2 | | 12/2021 | |
| JP | 2022-169826 | A | | 11/2022 | |
| KR | 10-1995-0003762 | A | | 2/1995 | |
| KR | 10-0271973 | B1 | | 11/2000 | |
| KR | 10-2006-0123925 | A | | 12/2006 | |
| KR | 10-0677879 | B1 | | 2/2007 | |
| KR | 10-2011-0056651 | A | | 5/2011 | |
| KR | 10-2012-0011716 | A | | 2/2012 | |
| KR | 10-1663835 | B1 | | 10/2016 | |
| KR | 10-2016-0150575 | A | | 12/2016 | |
| KR | 20170025697 | A | * | 3/2017 | ............. A45D 40/00 |
| KR | 10-2018-0098921 | A | | 9/2018 | |
| KR | 10-2019-0103086 | A | | 9/2019 | |
| KR | 20190103086 | A | * | 9/2019 | ......... G08B 13/1965 |
| KR | 10-2020-0084457 | A | | 7/2020 | |
| KR | 10-2021-0017392 | A | | 2/2021 | |
| KR | 10-2277266 | B1 | | 7/2021 | |
| KR | 10-2024-0034524 | A | | 3/2024 | |

OTHER PUBLICATIONS

Written Opinion (PCT/ISA/237) issued Mar. 7, 2024 by the International Searching Authority in International Patent Application No. PCT/KR2023/018858.

* cited by examiner

FIG. 5

| CLASSIFICATION | DRIVING FREQUENCY OF COMPRESSOR (RPM) (STAGE 0 TO STAGE 2) | ROTATION FREQUENCY OF FAN MOTOR (RPM) (STAGE 0 TO STAGE 2) |
|---|---|---|
| DRIVING STATE INFORMATION 0 | STAGE 0 | STAGE 0 |
| DRIVING STATE INFORMATION 1 | STAGE 0 | STAGE 1 |
| DRIVING STATE INFORMATION 2 | STAGE 0 | STAGE 2 |
| DRIVING STATE INFORMATION 3 | STAGE 1 | STAGE 0 |
| DRIVING STATE INFORMATION 4 | STAGE 1 | STAGE 1 |
| DRIVING STATE INFORMATION 5 | STAGE 1 | STAGE 2 |
| DRIVING STATE INFORMATION 6 | STAGE 2 | STAGE 0 |
| DRIVING STATE INFORMATION 7 | STAGE 2 | STAGE 1 |
| DRIVING STATE INFORMATION 8 | STAGE 2 | STAGE 2 |

FIG. 7

| CLASSIFICATION | DRIVING FREQUENCY OF COMPRESSOR (RPM) (STAGE 0 TO STAGE 2) | ROTATION FREQUENCY OF FAN MOTOR (RPM) (STAGE 0 TO STAGE 2) | AVERAGE LEVEL [DB] / DRIVING NOISE LEVEL | NOISE LEVEL (ORDER OF SIZES) |
|---|---|---|---|---|
| DRIVING STATE INFORMATION 0 | STAGE 0 | STAGE 0 | e.g. 15[dB]) / ~ | NOISE LEVEL 0 |
| DRIVING STATE INFORMATION 1 | STAGE 0 | STAGE 1 | e.g. 26[dB] / 11 (26~15) | NOISE LEVEL 2 |
| DRIVING STATE INFORMATION 2 | STAGE 0 | STAGE 2 | e.g. 37[dB] / 22 (37~15) | NOISE LEVEL 5 |
| DRIVING STATE INFORMATION 3 | STAGE 1 | STAGE 0 | e.g. 25[dB] / 10 (25~15) | NOISE LEVEL 1 |
| DRIVING STATE INFORMATION 4 | STAGE 1 | STAGE 1 | e.g. 36[dB] / 21 (36~15) | NOISE LEVEL 4 |
| DRIVING STATE INFORMATION 5 | STAGE 1 | STAGE 2 | e.g. 47[dB] / 32 (47~15) | NOISE LEVEL 7 |
| DRIVING STATE INFORMATION 6 | STAGE 2 | STAGE 0 | e.g. 35[dB] / 20 (35~15) | NOISE LEVEL 3 |
| DRIVING STATE INFORMATION 7 | STAGE 2 | STAGE 1 | e.g. 46[dB] / 31 (46~15) | NOISE LEVEL 6 |
| DRIVING STATE INFORMATION 8 | STAGE 2 | STAGE 2 | e.g. 57[dB] / 42 (57~15) | NOISE LEVEL 8 |

FIG. 8

| NOISE LEVEL | ALIGNMENT OF DRIVING STATE INFORMATION ACCORDING TO THE ORDER OF THE SIZES OF THE NOISE LEVELS (ALIGNED IN THE ORDER OF THE CORRECTION VALUES) |
|---|---|
| NOISE LEVEL 0 | DRIVING STATE INFORMATION 0 |
| NOISE LEVEL 1 | DRIVING STATE INFORMATION 3 |
| NOISE LEVEL 2 | DRIVING STATE INFORMATION 1 |
| NOISE LEVEL 3 | DRIVING STATE INFORMATION 6 |
| NOISE LEVEL 4 | DRIVING STATE INFORMATION 4 |
| NOISE LEVEL 5 | DRIVING STATE INFORMATION 2 |
| NOISE LEVEL 6 | DRIVING STATE INFORMATION 7 |
| NOISE LEVEL 7 | DRIVING STATE INFORMATION 5 |
| NOISE LEVEL 8 | DRIVING STATE INFORMATION 8 |

FIG. 9

| CURRENT DRIVING STATE INFORMATION | RECEPTION NOISE LEVEL [dB] | DRIVING NOISE LEVEL / NOISE LEVEL | EXTERNAL NOISE LEVEL | RATIO OF THE EXTERNAL NOISE LEVEL TO THE DRIVING NOISE LEVEL | THRESHOLD RATIO |
|---|---|---|---|---|---|
| DRIVING STATE INFORMATION 4 | 37[dB] | 21 NOISE LEVEL 4 | 16[dB] (37-21) | 0.76 (16/21) | 0.9 |

FIG. 10

| CURRENT DRIVING STATE INFORMATION | RECEPTION NOISE LEVEL [dB] | DRIVING NOISE LEVEL / NOISE LEVEL | EXTERNAL NOISE LEVEL | RATIO OF THE EXTERNAL NOISE LEVEL TO THE DRIVING NOISE LEVEL | THRESHOLD RATIO |
|---|---|---|---|---|---|
| DRIVING STATE INFORMATION 7 | 50[dB] | 31<br>NOISE LEVEL 6 | 29[dB] (50-31) | 0.94 (29/31) | 0.9 |

FIG. 13

| TIME ZONE | EXTERNAL NOISE LEVEL FOR EACH TIME ZONE |
|---|---|
| 0:00 ~ 1:00 | 29 |
| 1:00 ~ 2:00 | 30 |
| 2:00 ~ 3:00 | 38 |
| 3:00 ~ 4:00 | 32 |
| 4:00 ~ 5:00 | 29 |
| 5:00 ~ 6:00 | 38 |
| 6:00 ~ 7:00 | 42 |
| 7:00 ~ 8:00 | 39 |
| 8:00 ~ 9:00 | 45 |
| 9:00 ~ 10:00 | 67 |
| 10:00 ~ 11:00 | 77 |
| 11:00 ~ 12:00 | 60 |
| 12:00 ~ 13:00 | 50 |
| 13:00 ~ 14:00 | 67 |
| 14:00 ~ 15:00 | 77 |
| 15:00 ~ 16:00 | 60 |
| 16:00 ~ 17:00 | 50 |
| 17:00 ~ 18:00 | 67 |
| 18:00 ~ 19:00 | 77 |
| 19:00 ~ 20:00 | 60 |
| 20:00 ~ 21:00 | 50 |
| 21:00 ~ 22:00 | 67 |
| 22:00 ~ 23:00 | 77 |
| 23:00 ~ 0:00 | 45 |

LOWEST VALUE OF LIFE NOISE:29

REFERENCE VALUE OF DRIVING TIMES WITH REDUCED NOISES : 39 (29+10=39)

DRIVING TIMES WITH REDUCED NOISES : 0:00~1:00, 1:00~2:00, 2:00~3:00, 3:00~4:00, 4:00~5:00, 5:00~6:00, 7:00~8:00

REFRIGERATOR DRIVEN BASED ON AMBIENT NOISE AND CONTROL METHOD THEREOF

CROSS-REFERENCE TO RELATED APPLICATION(S)

This application is a bypass continuation of International Application No. PCT/KR2023/018858, filed on Nov. 22, 2023, which is based on and claims priority to Korean Patent Application No. 10-2022-0158175, filed on Nov. 23, 2022, in the Korean Intellectual Property Office, the disclosures of which are incorporated by reference herein in their entireties.

BACKGROUND

1. Field

The disclosure relates to a refrigerator and a control method thereof, and more particularly, to a refrigerator, that is driven based on an ambient noise, and a control method thereof.

2. Description of Related Art

Appliances inside homes, such as a refrigerator, may be provided with a method for reducing noises generated according to driving of the home appliances.

However, in the related art, a refrigerator provided with a method of driving in a specific driving state for reducing noises at once under a specific condition (e.g., at a specific time zone), does not consider noises generated in the ambient environment inside the home, e.g., around the refrigerator.

Accordingly, there has been a demand for a method of identifying a driving state for reducing noises in consideration of noises generated around a refrigerator, and actively identifying an optimum driving state among a plurality of driving states instead of just driving in a specific driving state.

SUMMARY

According to an aspect of the disclosure, there is a refrigerator including: a microphone; and at least one processor configured to: identify a first driving noise level corresponding to first driving state information of the refrigerator, based on receiving an ambient noise through the microphone while operating according to the first driving state information, identify a reception noise level based on the received ambient noise, identify an external noise level based on the reception noise level and the first driving noise level, and based on a ratio of the external noise level to the first driving noise level being smaller than a threshold ratio, drive the refrigerator based on second driving state information corresponding to a lower noise level than the first driving state information.

The refrigerator may further include: a compressor; and a fan motor, and the first driving state information corresponds to a first driving frequency of the compressor and a first rotation frequency of the fan motor, and the at least one processor may be further configured to adjust at least one of the first driving frequency and the first rotation frequency to a low frequency based on the second driving state information, the low frequency being lower than the at least one of the first driving frequency and the first rotation frequency.

The at least one processor may be further configured to input the reception noise level and the first driving noise level into a neural network model and acquire the second driving state information among a plurality of driving state information, and the neural network model may be a model trained to output any one driving state information among the plurality of driving state information based on driving noise levels and reception noise levels corresponding to the plurality of respective driving state information.

The at least one processor may be further configured to drive the refrigerator during a first time and receive reception noise levels corresponding to a plurality of respective driving state information, acquire driving noise levels corresponding to the plurality of respective driving state information based on the plurality of reception noise levels acquired through the microphone during the first time, and allot noise levels to the plurality of respective driving state information according to sizes of the plurality of respective driving noise levels.

The at least one processor may be further configured to acquire the driving noise levels corresponding to the plurality of respective driving state information based on an average level of reception noise levels corresponding to the plurality of respective driving state information, and the reception noise levels may include the reception noise level.

The at least one processor may be further configured to: drive the refrigerator during a second time and receive reception noise levels corresponding to a plurality of respective driving state information through the microphone, divide the second time into a plurality of sections including a first section and a second section, identify a first external noise level corresponding to the first section based on a driving noise level, corresponding to driving state information during the first section, and a first reception noise level of the first section, and identify a second external noise level corresponding to the second section based on a driving noise level, corresponding to driving state information during the second section, and a second reception noise level of the second section.

The at least one processor may be further configured to: identify external noise levels corresponding to the plurality of respective sections, identify a lowest noise level among the plurality of external noise levels, and identify at least one section among the plurality of sections as a low noise section based on the lowest noise level, and the external noise levels may include the external noise level.

The at least one processor may be further configured to: based on a current time section corresponding to the low noise section, identify whether the ratio of the external noise level to the first driving noise level is smaller than the threshold ratio, based on the ratio of the external noise level to the first driving noise level being smaller than the threshold ratio, drive the refrigerator based on the second driving state information, and based on the current time section not corresponding to the low noise section, drive the refrigerator based on the first driving state information.

The refrigerator may further include: a communication interface, and the at least one processor may be further configured to, based on the reception noise level according to the ambient noise received through the microphone exceeding a threshold level, provide a notification to an external device through the communication interface.

The at least one processor may be further configured to: identify a second driving noise level corresponding to the second driving state information, and based on a ratio of the external noise level to the second driving noise level being smaller than the threshold ratio, drive the refrigerator based on third driving state information corresponding to a second lower noise level that is lower than the second driving noise level.

According to an aspect of the disclosure, there is a control method of a refrigerator, the method including: identifying a first driving noise level corresponding to first driving state information of the refrigerator; based on receiving an ambient noise through a microphone of the refrigerator while operating according to the first driving state information, identifying a reception noise level based on the received ambient noise; identifying an external noise level based on the reception noise level and the first driving noise level; and based on a ratio of the external noise level to the first driving noise level being smaller than a threshold ratio, driving the refrigerator based on second driving state information corresponding to a lower noise level than the first driving state information.

The first driving state information may correspond to a first driving frequency, of a compressor provided on the refrigerator, and a first rotation frequency of a fan motor provided on the refrigerator, and the driving the refrigerator may include adjusting at least one of the first driving frequency and the first rotation frequency to a low frequency based on the second driving state information, the low frequency being lower than the at least one of the first driving frequency and the first rotation frequency.

The driving the refrigerator may include inputting the reception noise level and the first driving noise level into a neural network model and acquiring the second driving state information among a plurality of driving state information, and the neural network model may be a model trained to output any one driving state information among the plurality of driving state information based on driving noise levels and reception noise levels corresponding to the plurality of respective driving state information.

The control method may further include: driving the refrigerator during a first time and receiving reception noise levels corresponding to a plurality of respective driving state information; acquiring driving noise levels corresponding to the plurality of respective driving state information based on the plurality of reception noise levels received during the first time; and allotting noise levels to the plurality of respective driving state information according to sizes of the plurality of respective driving noise levels.

The acquiring the driving noise levels corresponding to the plurality of respective driving state information may include acquiring the driving noise levels corresponding to the plurality of respective driving state information based on an average level of reception noise levels corresponding to the plurality of respective driving state information, and the reception noise levels may include the reception noise level.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram for illustrating a plurality of driving state information according to one or more embodiments of the disclosure;

FIG. 7 is a diagram for illustrating correction values and noise levels corresponding to driving noise levels according to one or more embodiments of the disclosure;

FIG. 8 is a diagram for illustrating a method of aligning a plurality of driving state information according to the order of the sizes of noise levels according to one or more embodiments of the disclosure;

FIG. 9 is a diagram for illustrating a method of comparing a ratio of an external noise level to a driving noise level and a threshold ratio according to one or more embodiments of the disclosure;

FIG. 10 is a diagram for illustrating a method of comparing a ratio of an external noise level to a driving noise level and a threshold ratio according to one or more embodiments of the disclosure;

FIG. 13 is a diagram for illustrating a method of identifying a low noise section among a plurality of sections according to one or more embodiments of the disclosure;

DETAILED DESCRIPTION

Figure 1:
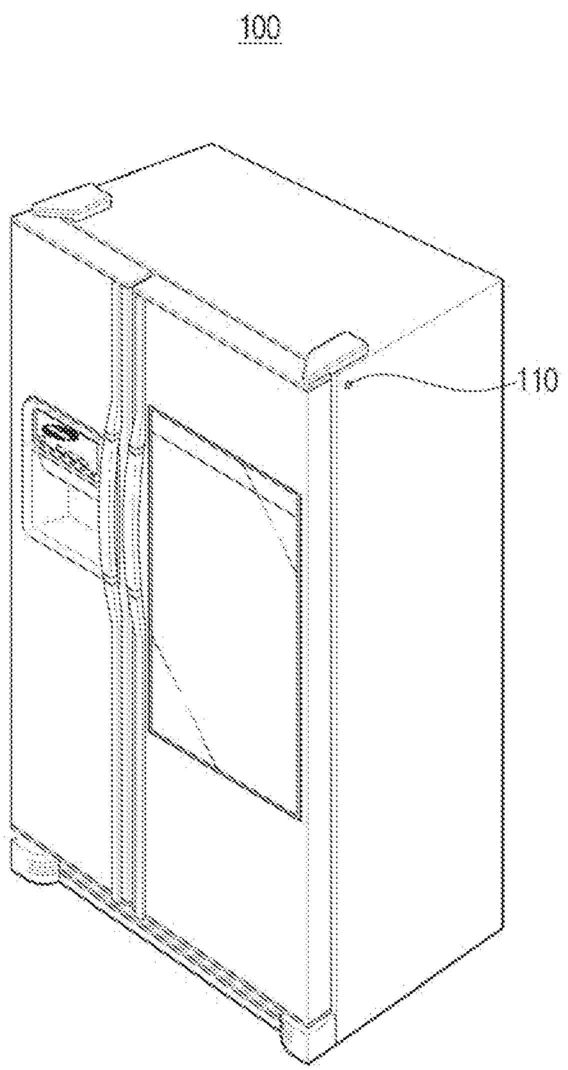
FIG. 1 is a diagram for illustrating a refrigerator according to one or more embodiments of the disclosure.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B." The expression "at least one of a, b or c" indicates only a, only b, only c, both a and b, both a and c, both b and c, or all of a, b, and c.

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

In addition, in this specification, the term "user" may refer to a person who uses an electronic device or a device using an electronic device (e.g.: an artificial intelligence electronic device).

Hereinafter, embodiments of the disclosure will be described in more detail with reference to the accompanying drawings.

FIG. 1 is a diagram for illustrating a refrigerator according to one or more embodiments of the disclosure.

FIG. 1 is a diagram illustrating the exterior of a refrigerator 100 according to one or more embodiments of the disclosure. In the disclosure, explanation is described by assuming the refrigerator 100 for convenience of explanation, but this is merely an embodiment, and the disclosure is obviously not limited thereto. The various embodiments of the disclosure can be implemented in various types of electronic devices other than the refrigerator 100. For example, electronic devices may include at least one of a TV, a user terminal device, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, a virtual reality (VR) implementation device, or a wearable device. Here, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothes (e.g.: electronic clothes), a body-attached device (e.g.: a skin pad or a tattoo), or an implantable circuit. Also, in some embodiments, the electronic device 100 may include at least one of a TV, a digital video disk (DVD) player, an audio, a refrigerator, an air conditioner, a cleaner, an oven, a microwave oven, a washing machine, an air purifier, a source device (e.g., a set-top box, a cloud server, an OTT service (an over-the-top media service) server, etc.), a home automation control panel, a security control panel, a media box (e.g.: Apple TV™ or Google TV™), an LED S-Box, a game console (e.g.: Xbox™, PlayStation™, Nintendo Switch™), an electronic dictionary, an electronic key, a camcorder, or an electronic photo frame.

In other embodiments, the electronic device may include at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, electronic equipment for vessels (e.g.: a navigation device for vessels, a gyrocompass, etc.), avionics, a security device, a head unit for vehicles, an industrial or a household robot, a drone, an ATM of a financial institution, a point of sales (POS) of a store, or an Internet of Things (IoT) device (e.g.: a light bulb, various types of sensors, a sprinkler device, a fire alarm, a thermostat, a street light, a toaster, exercise equipment, a hot water tank, a heater, a boiler, etc.). Hereinafter, the electronic device will be assumed as the refrigerator 100 for convenience of explanation.

Referring to FIG. 1, the refrigerator 100 may include a main body of which front surface is opened, a storage which is formed inside the main body and wherein food is refrigerated and/or kept, and a door opening or closing the opened front surface of the main body.

Here, the main body may form the exterior of the refrigerator 100. The main body may include an inner cabinet forming the storage, and an external cabinet that is coupled with the inner cabinet and forms the exterior of the main body.

The storage may be partitioned into a plurality of parts by a horizontal partition wall and a vertical partition wall. As an example, the storage may be partitioned into an upper storage and a lower storage, and in the storages, shelves and airtight containers, etc. may be provided.

The storages may be opened or closed by doors. For example, one area of the upper storage may be opened or closed by an upper first door, and the remaining area of the upper storage may be opened or closed by an upper second door. Also, one area of the lower storage may be opened or closed by a lower first door, and the remaining area may be opened or closed by a lower second door.

The doors may include handles so that the doors can be opened or closed easily. As an example, a handle may be formed lengthily in an up-down direction (or, a left-right direction) along the space between the upper first door and the upper second door, and may be formed lengthily in an up-down direction (or, a left-right direction) along the space between the lower first door and the lower second door.

In particular, the refrigerator 100 according to one or more embodiments of the disclosure may include a microphone 110. For example, the microphone 110 may be provided in one area of the side surface of the main body. Also, the microphone 110 according to one or more embodiments may receive an ambient noise.

Here, the ambient noise may include noises generated from the refrigerator 100 according to driving of the refrigerator 100 (e.g., a driving sound generated from a compressor, a motor, etc. provided on the refrigerator 100, a beep sound generated from a speaker provided on the refrigerator 100, etc.) (referred to as driving noises hereinafter), life noises generated around the refrigerator 100 other than driving noises (e.g., a voice noise or a non-voice noise, etc.) (referred to as external noises hereinafter), etc.

If a driving noise is recognized to be relatively bigger than a life noise (i.e., an external noise) based on the ambient noise received through the microphone 110, the refrigerator 100 according to one or more embodiments of the disclosure may change the driving state of the refrigerator 100 for reducing the size of the noise generated according to the driving of the refrigerator 100 (i.e., the driving noise).

For example, if a driving noise is recognized to be relatively bigger than an external noise, the refrigerator 100 may reduce the size of the noise generated from the refrigerator 100 (i.e., the driving noise) by adjusting the driving frequency of the compressor provided on the refrigerator 100, the rotation frequency of the fan motor, etc. to a low frequency.

Hereinafter, a method for the refrigerator 100 to receive an ambient noise, identify the ratio of an external noise to a driving noise from the received ambient noise, and if the ratio of the external noise to the driving noise is smaller than a threshold ratio, change the driving state of the refrigerator 100 according to the various embodiments of the disclosure will be described.

Figure 2:
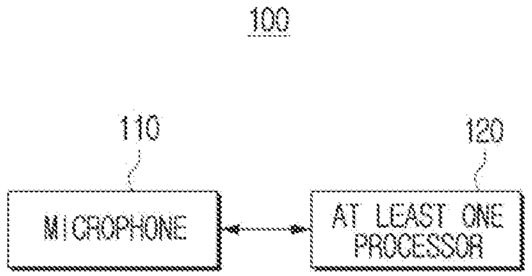
FIG. 2 is a block diagram for illustrating a configuration of a refrigerator according to one or more embodiments of the disclosure.

FIG. 2 is a block diagram for illustrating a configuration of a refrigerator according to one or more embodiments of the disclosure.

Referring to FIG. 2, the refrigerator 100 includes a microphone 110 and at least one processor 120.

The microphone 110 according to one or more embodiments is a component for receiving an ambient noise of the refrigerator 100, and converting the noise into an electronic signal. As an example, the microphone 110 may be provided on the upper side of the side surface or the lower side of the side surface of the main body, the upper side or the lower side of the door, etc. The microphone 110 according to one or more embodiments may receive an ambient noise generated around the refrigerator 100 and transmit the noise to the at least one processor 120.

The at least one processor 120 according to one or more embodiments of the disclosure controls the overall operations of the refrigerator 100.

According to one or more embodiments of the disclosure, the at least one processor 120 may be implemented as a digital signal processor (DSP) processing digital signals, a microprocessor, and a timing controller (TCON). However, the disclosure is not limited thereto, and the at least one processor 120 may include one or more of a central processing unit (CPU), a micro controller unit (MCU), a micro processing unit (MPU), a controller, an application processor (AP), or a communication processor (CP), an advanced reduced instruction set computer (RISC) machine (ARM) processor, and an artificial intelligence (AI) processor, or may be defined by the terms. Also, the at least one processor 120 may be implemented as a system on chip (SoC) having a processing algorithm stored therein or large scale integration (LSI), or implemented in the form of a field programmable gate array (FPGA). The at least one processor 120 may perform various functions by executing computer executable instructions stored in the memory.

Also, the at least one processor 120 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 120 may control one or a random combination of the other components of the electronic device, and perform an operation related to communication or data processing. In addition, the at least one processor 120 may execute at least one program or instruction stored in the memory. For example, the at least one processor 120 may perform the method according to one or more embodiments of the disclosure by executing at least one instruction stored in the memory.

In case the method according to one or more embodiments of the disclosure includes a plurality of operations, the plurality of operations may be performed by one processor, or performed by a plurality of processors. For example, when a first operation, a second operation, and a third operation are performed by the method according to one or more embodiments, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 120 may be implemented as a single core processor including one core, or it may be implemented as one or more multicore processors including a plurality of cores (e.g., multicores of the same kind or multicores of different kinds). In case the at least one processor 120 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according to one or more embodiments of the disclosure and perform the instruction, or the plurality of entire cores (or some of the cores) may be linked with one another, and read a program instruction for implementing the method according to one or more embodiments of the disclosure and perform the instruction.

Also, in case the method according to one or more embodiments of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to one or more embodiments, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the processor may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, a DSP, an NPU, a hardware accelerator, or a machine learning accelerator, etc., but the embodiments of the disclosure are not limited thereto.

Figure 3:
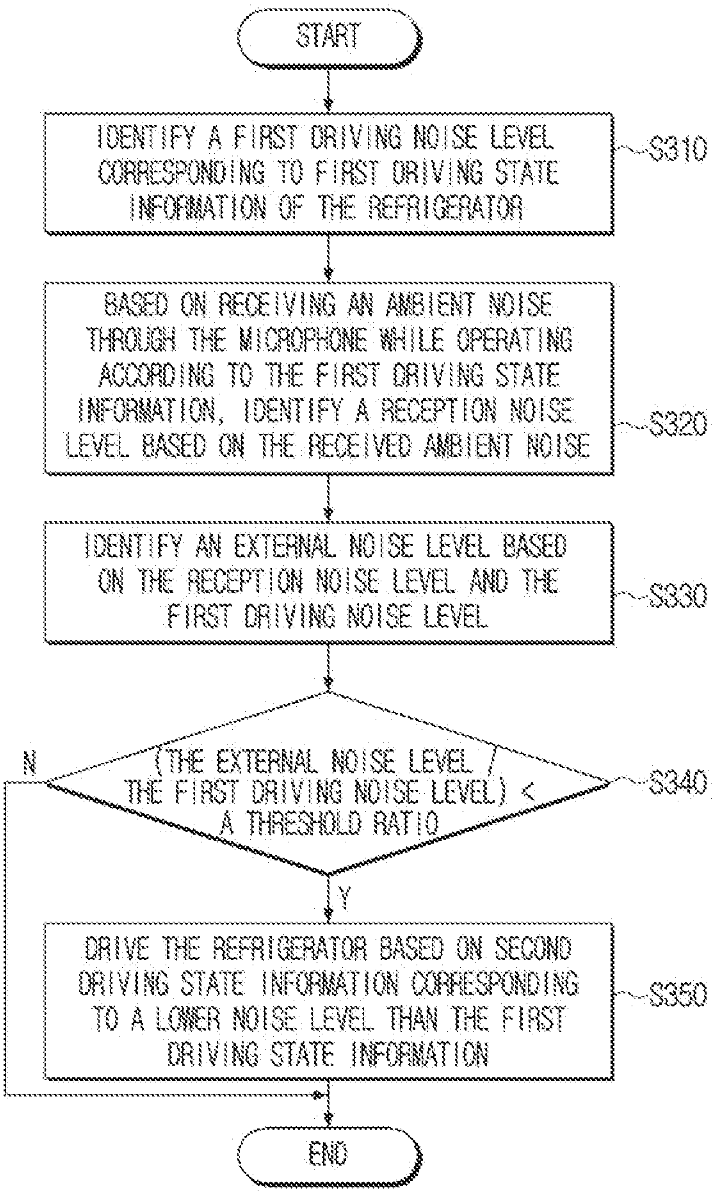
FIG. 3 is a flow chart for illustrating a control method of a refrigerator according to one or more embodiments of the disclosure.

FIG. 3 is a flow chart for illustrating a control method of a refrigerator according to one or more embodiments of the disclosure.

Referring to FIG. 3, first, the at least one processor 120 according to one or more embodiments identifies a first driving noise level corresponding to first driving state information of the refrigerator 100 in operation S310.

Here, a driving noise level corresponding to driving state information may mean the size of a sound corresponding to a driving noise generated from the refrigerator 100 (e.g., a driving sound generated from a compressor, a motor, etc. provided on the refrigerator 100) while the refrigerator 100 is driven according to the driving state information (referred to as a driving noise level hereinafter) (e.g., a loudness level (phon), a sound pressure level (dB), etc.).

A method of identifying a driving noise level corresponding to driving state information will be described later based on FIG. 4, FIG. 5, FIG. 6, and FIG. 7.

Then, if an ambient noise is received through the microphone 110 while the refrigerator 100 is driven according to the first driving state information, the at least one processor 120 may identify the size of a sound corresponding to the ambient noise (referred to as a reception noise level hereinafter) in operation S320.

Then, the at least one processor 120 may identify an external noise level based on the reception noise level and the first driving noise level in operation S330. Here, the external noise level may mean the remaining noise level excluding the driving noise level in the reception noise level acquired through the microphone 110 while the refrigerator 100 is driven (i.e., the size of a sound corresponding to a life noise (referred to as an external noise level hereinafter)).

Then, if the ratio of the external noise level to the first driving noise level is smaller than a threshold ratio (i.e., the external noise level/the first driving noise level<the threshold ratio) in operation S340: Y, the at least one processor 120 drives the refrigerator 100 based on second driving state information corresponding to a lower noise level than the first driving state information in operation S350.

Hereinafter, a method for the at least one processor 120 to acquire driving noise levels corresponding to a plurality of respective driving state information of the refrigerator 100 according to one or more embodiments of the disclosure will be described.

Figure 4:
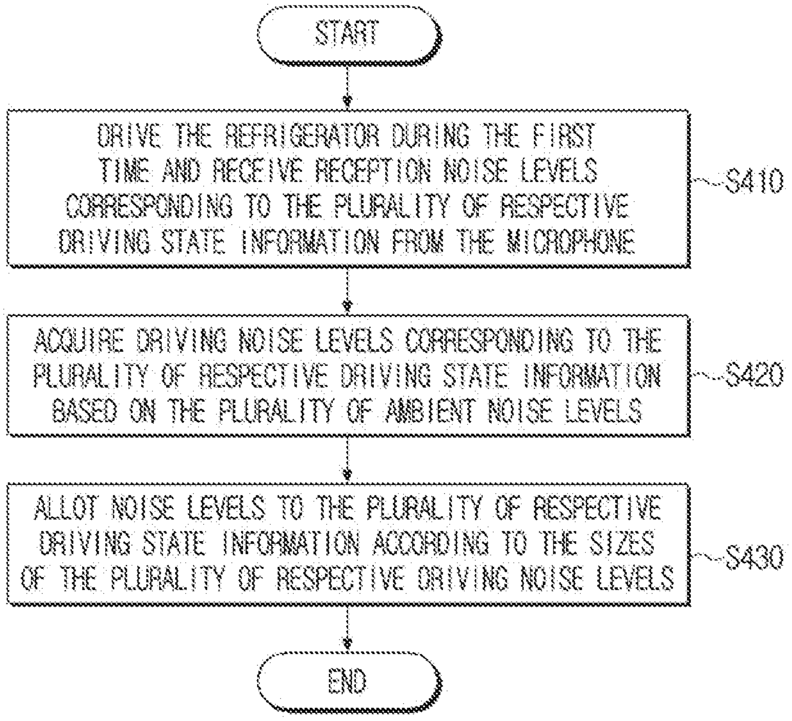
FIG. 4 is a flow chart for illustrating a method of acquiring a driving noise level by driving a refrigerator during a first time according to one or more embodiments of the disclosure.

FIG. 4 is a flow chart for illustrating a method of acquiring a driving noise level by driving a refrigerator during a first time according to one or more embodiments of the disclosure.

First, the at least one processor 120 drives the refrigerator 100 during a first time and acquires reception noise levels corresponding to a plurality of respective driving state information through the microphone 110 in operation S410.

For example, the at least one processor 120 may drive the refrigerator 100 arranged in a real use environment (e.g., a refrigerator 100 arranged inside a home) during the first time. Here, the first time is an example, and it may include a week, a month, etc.

As an example, the at least one processor 120 may not drive the refrigerator 100 based on only any one driving state information among the plurality of driving state information during the first time, but the at least one processor 120 may drive the refrigerator 100 based on each of the plurality of driving state information.

For example, the refrigerator 100 may not be driven only in any one driving state among a plurality of driving states during the first time, but the refrigerator 100 may be driven in a first driving state, in some sections of the first time, and may be driven in a second driving state, in some other sections, and may be driven in a third driving state, in still some other sections. Thus the refrigerator 100 may be driven in a plurality of driving states during the first time.

The at least one processor 120 according to one or more embodiments may acquire driving noise levels corresponding to the plurality of respective driving state information based on the plurality of reception noise levels received during the first time in operation S420.

Then, the at least one processor 120 may align the plurality of driving state information according to sizes of the plurality of respective driving noise levels in operation S430.

The method of acquiring driving noise levels corresponding to the plurality of respective driving state information as illustrated in FIG. 4 may be performed in the initial setting stage of the refrigerator 100 (e.g., the initial time point when the refrigerator 100 was arranged in a real use environment), but this is merely an example, and the disclosure is obviously not limited thereto.

Hereinafter, the plurality of driving state information, and the method for the at least one processor 120 to acquire driving noise levels corresponding to the plurality of respective driving state information based on the plurality of reception noise levels received during the first time in the operation S420 will be described in detail.

FIG. 5 is a diagram for illustrating a plurality of driving state information according to one or more embodiments of the disclosure.

Referring to FIG. 5, the refrigerator 100 includes a compressor and a fan motor. Here, the compressor compresses a refrigerant and circulates the refrigerant to make cold air necessary for the storages, and the fan motor may forcibly circulate the cold air made by the compressor.

A noise generated according to driving of the refrigerator 100 (i.e., a driving noise) is determined according to noises generated from each of the compressor and the fan motor, and thus each of the plurality of driving state information may correspond to a driving frequency of the compressor and a rotation frequency of the fan motor. For example, the first driving state information may correspond to a first driving frequency of the compressor and a first rotation frequency of the fan motor. According to an embodiment, the at least one processor 120 may drive the compressor in the first driving frequency, and drive the fan motor in the first rotation frequency based on the first driving state information.

Referring to FIG. 5, if the driving frequency of the compressor is divided into stage 0, stage 1, and stage 2, and the rotation frequency of the fan motor is divided into stage 0, stage 1, and stage 2, the plurality of driving state information may include driving state information 0, driving state information 1, driving state information 2, driving state information 3, driving state information 4, driving state information 5, driving state information 6, driving state information 7, and driving state information 8. In various embodiments of the disclosure, the first driving state information may mean any one of the driving state information 0, the driving state information 1, the driving state information 2, the driving state information 3, the driving state information 4, the driving state information 5, the driving state information 6, the driving state information 7, and the driving state information 8.

In FIG. 5, the driving frequency of the compressor was divided into the stage 0, the stage 1, and the stage 2, and the rotation frequency of the fan motor was divided into the stage 0, the stage 1, and the stage 2, for convenience of explanation. However, this is merely an example, and the stages may be divided into 0 to n stages according to the performance (the features, etc.) of the compressor, and may also be divided into 0 to n stages according to the performance of the fan motor. Also, the plurality of driving state information may include driving state information 0 to driving state information n2-1.

Figure 6:
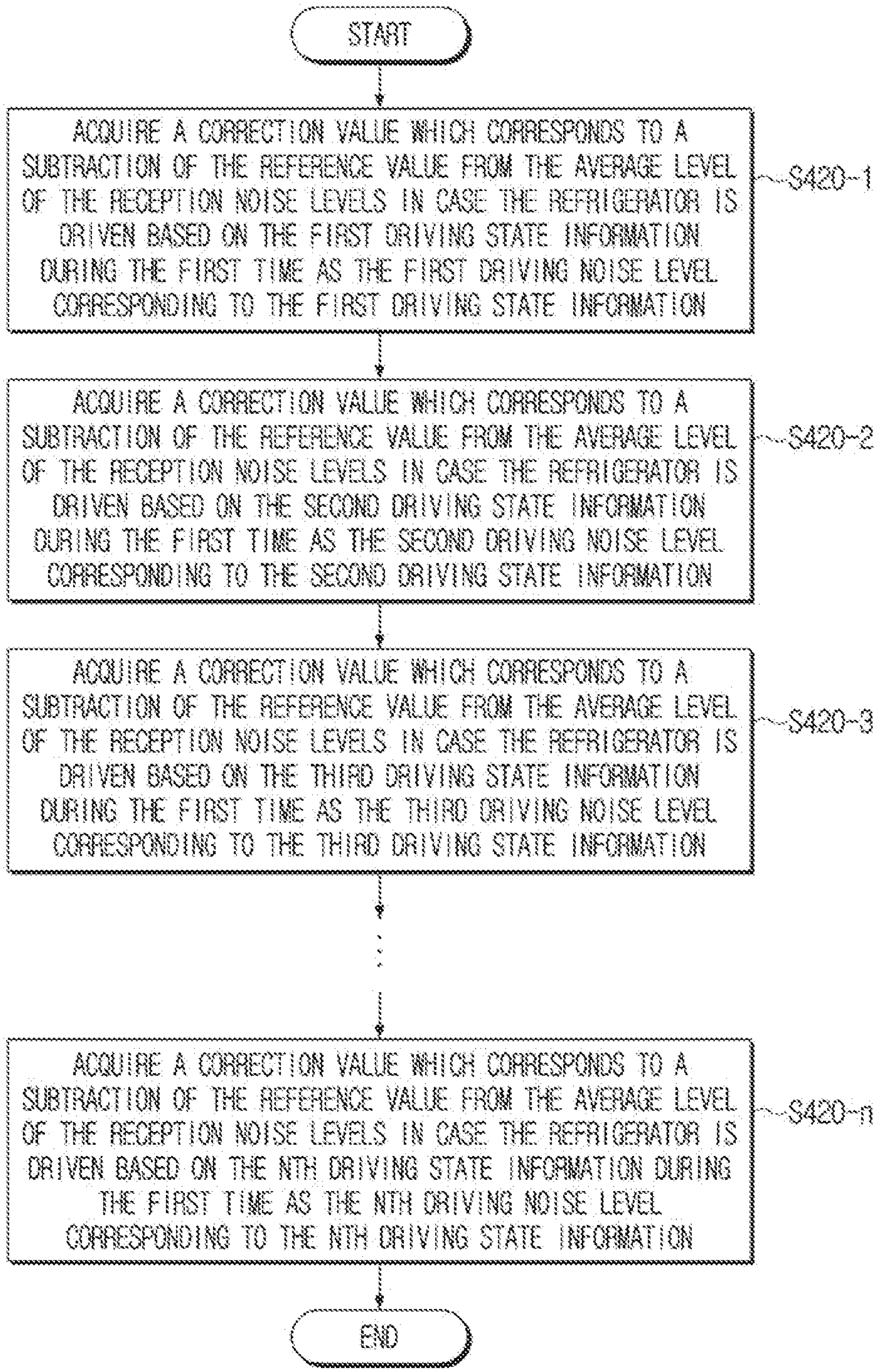
FIG. 6 is a flow chart for illustrating a method of acquiring driving noise levels corresponding to a plurality of respective driving state information according to one or more embodiments of the disclosure.

FIG. 6 is a flow chart for illustrating a method of acquiring driving noise levels corresponding to a plurality of respective driving state information according to one or more embodiments of the disclosure.

Referring to FIG. 6, the at least one processor 120 according to one or more embodiments may, after the first time passed, acquire driving noise levels corresponding to the plurality of respective driving state information based on the plurality of reception noise levels received in the operation S410 in FIG. 4 in operation S420.

First, the at least one processor 120 may acquire an average level of the reception noise levels acquired through the microphone 110 while the refrigerator 100 is driven in a minimum driving state during the first time as a driving noise level corresponding to the minimum driving state, and identify the driving noise level corresponding to the minimum driving state as a reference value.

Then, describing the operation S420 in detail, the at least one processor 120 may acquire a correction value which corresponds to a subtraction (deduction) of the reference value (i.e., the driving noise level corresponding to the minimum driving state) from the average level of the reception noise levels acquired through the microphone 110 while the refrigerator 100 is driven based on the first driving state information during the first time as the first driving noise level corresponding to the first driving state information in operation S420-1. For example, if the first driving state information is the minimum driving state of the refrigerator 100, the first driving noise level may become 0.

For example, an ambient noise received from the microphone 110 while the refrigerator 100 is driven based on the first driving state information includes both of a driving noise and an external noise, but the size occupied by the external noise in the average of the ambient noises received during a relatively long time (e.g., some sections of the first time) is adjacent to the size of the noise generated in a state wherein the refrigerator 100 is driven at the minimum (i.e., the minimum driving state), and thus the at least one processor 120 may acquire a correction value which corresponds to a subtraction of the reference value from the average level of the reception noise levels acquired through the microphone 110 while the refrigerator 100 is driven based on the first driving state information as the first driving noise level corresponding to the first driving state information.

Then, the at least one processor 120 may acquire a correction value which corresponds to a subtraction of the reference value from the average level of the reception noise levels acquired through the microphone 110 while the refrigerator 100 is driven based on the second driving state information during the first time as the second driving noise level corresponding to the second driving state information in operation S420-2.

Then, the at least one processor 120 may acquire a correction value which corresponds to a subtraction of the reference value from the average level of the reception noise levels acquired through the microphone 110 while the refrigerator 100 is driven based on the nth driving state information during the first time as the nth driving noise level corresponding to the nth driving state information in operation **S420-*n***.

As illustrated in FIG. 6, according to the operations S420-1, S420-2, S420-3, and to **S420-*n*, the at least one processor 120** may acquire driving noise levels corresponding to the plurality of respective driving state information.

FIG. 7 is a diagram for illustrating correction values and noise levels corresponding to driving noise levels according to one or more embodiments of the disclosure.

Referring to FIG. 7, driving state information 0 among the plurality of driving state information may include a standby state (or, an idle state) of the refrigerator 100 wherein the driving frequency of the compressor is the stage 0, and the rotation frequency of the fan motor is the stage 0. That is, the driving state information 0 may mean the minimum driving state of the refrigerator 100 (e.g., the idle state of the refrigerator 100 wherein each of the driving frequency and the rotation frequency is the lowest).

According to one or more embodiments, the at least one processor 120 may allot noise levels to the plurality of respective driving state information according to the sizes of the plurality of respective driving noise levels.

Referring to FIG. 7, the at least one processor 120 may allot a noise level 0 to the standby state of the refrigerator 100, i.e., the driving state information 0 wherein the driving noise level is the lowest. Also, the at least one processor 120 may allot a noise level 1 to the driving state information 3 wherein the driving noise level is the second smallest after the driving state information 0.

According to one or more embodiments, the at least one processor 120 may allot noise levels to each of the driving state information 0, the driving state information 1, the driving state information 2, the driving state information 3, the driving state information 4, the driving state information 5, the driving state information 6, the driving state information 7, and the driving state information 8 according to the order of the sizes of the driving noise levels.

As an example, the at least one processor 120 may acquire a correction value which corresponds to a subtraction of the reference value from the average level corresponding to driving state information as a driving noise level corresponding to the driving state information. Here, the reference value may mean the average level of the reception noise levels acquired through the microphone 110 while the refrigerator 100 is driven in the minimum driving state (e.g., a driving state wherein the driving frequency of the compressor is the stage 0, and the rotation frequency of the fan motor is the stage 0).

As described above, the at least one processor 120 may acquire a correction value which corresponds to a subtraction of the reference value from the average level of the reception noise levels acquired through the microphone 110 in each of the plurality of driving state information, and acquire the correction values corresponding to the plurality of respective driving state information as the driving noise levels corresponding to the plurality of respective driving state information.

Then, the at least one processor 120 may allot noise levels to the plurality of respective driving state information (e.g., the driving state information 0, the driving state information 1, the driving state information 2, the driving state information 3, the driving state information 4, the driving state information 5, the driving state information 6, the driving state information 7, and the driving state information 8) according to the order of the sizes of the plurality of driving noise levels.

FIG. 8 is a diagram for illustrating a method of aligning a plurality of driving state information according to the order of the sizes of noise levels according to one or more embodiments of the disclosure.

When the driving noise levels corresponding to the plurality of respective driving state information are acquired in the operation S420 in FIG. 4, the at least one processor 120 may align the plurality of driving state information according to the sizes of the plurality of respective driving noise levels (or, the plurality of correction values) in operation S430.

As an example, when the plurality of driving state information are aligned (e.g., an ascending order) according to the noise levels (i.e., the order of the sizes of the driving noise levels or the order of the sizes of the correction values), the noise levels may increase in the order of the driving state information 0->3->1->6->4->2->7->5->8. For example, a noise generated from the refrigerator 100 when the refrigerator 100 is driven based on the driving state information 2 may be relatively bigger than a noise generated from the refrigerator 100 when the refrigerator 100 is driven based on the driving state information 6.

The specific numbers of the noise levels allotted to the plurality of respective driving state information, etc. illustrated in FIG. 8 are merely an example for convenience of explanation, and it is obvious that the noise levels allotted to the driving state information can be changed according to the performance (or, the features), etc. of each of the various components included in the refrigerator 100 (e.g., the compressor, the fan motor, the speaker, etc.).

FIG. 9 is a diagram for illustrating a method of comparing a ratio of an external noise level to a driving noise level and a threshold ratio according to one or more embodiments of the disclosure.

According to one or more embodiments, the at least one processor 120 may drive the refrigerator 100 based on the first driving state information. For convenience of explanation, the first driving state information may be assumed as the driving state information 4 among the plurality of driving state information as illustrated in FIG. 9.

Also, according to one or more embodiments, the at least one processor 120 may drive the compressor in the stage 1 of the driving frequency, and drive the fan motor in the stage 1 of the rotation frequency based on the first driving state information as illustrated in FIG. 5.

Then, the at least one processor 120 may identify the first driving noise level corresponding to the first driving state information (e.g., 36 dB).

Then, when an ambient noise is received through the microphone, the at least one processor 120 may identify a reception noise level (e.g., 37 dB) based on the received ambient noise, and identify an external noise level (e.g., 16 dB (=37−21)) based on the reception noise level and the first driving noise level.

Then, if the ratio of the external noise level to the first driving noise level (e.g., the external noise level (16 dB)/the first driving noise level (21 dB)=0.76) is smaller than the threshold ratio (e.g., 0.9), the at least one processor 120 may identify the second driving state information corresponding to a lower noise level than the first driving state information.

Here, as the first driving state information is the noise level 4, the at least one processor 120 may identify the second driving state information corresponding to the noise level 3, which is a lower noise level than the first driving state information. Referring to FIG. 8, the at least one processor 120 may identify the driving state information 6 corresponding to the noise level 3 as the second driving state information.

Then, the at least one processor 120 may drive the refrigerator 100 based on the second driving state information. According to one or more embodiments, the at least one processor 120 may drive the compressor in the stage 2 of the driving frequency, and drive the fan motor in the stage 0 of the rotation frequency based on the second driving state information, as illustrated in FIG. 5.

For example, the at least one processor 120 adjusts at least one of the driving frequency of the compressor or the rotation frequency of the fan motor to a low frequency, and may thus reduce the size of a noise generated according to the driving of the refrigerator 100 (i.e., a driving noise). That is, in an ambient noise, a driving noise is a more important factor than a life noise, and the at least one processor 120 may reduce the ambient noise by reducing the driving noise by changing the current driving state information.

Also, for example, as a ratio occupied by a driving noise in an ambient noise is relatively bigger than a ratio occupied by a life noise, the user recognizes the driving noise to be relatively bigger, and accordingly, the at least one processor 120 may reduce the ambient noise by reducing the driving noise by changing the current driving state information.

The at least one processor 120 may drive the refrigerator 100 based on the second driving state information which is a lower noise level than the first driving state information (e.g., lower by one noise level). Also, when an ambient noise is received through the microphone while the refrigerator 100 is driven based on the second driving state information, the at least one processor 120 may identify a reception noise level based on the received ambient noise, and identify an external noise level based on the reception noise level and the second driving noise level corresponding to the second driving state information.

Then, if the ratio of the external noise level to the second driving noise level (e.g., the external noise level (16 dB)/the second driving noise level (20 dB)=0.8) is smaller than the threshold ratio (e.g., 0.9), the at least one processor 120 may identify the third driving state information corresponding to a lower noise level than the second driving state information (e.g., lower by one noise level or more).

Here, as the second driving state information is the noise level 3, the at least one processor 120 may identify the driving state information 1 corresponding to the noise level 2, which is a lower noise level than the second driving state information, as the third driving state information.

Then, the at least one processor 120 may drive the refrigerator 100 based on the third driving state information. According to one or more embodiments, the at least one processor 120 may drive the compressor in the stage 0 of the driving frequency, and drive the fan motor in the stage 0 of the rotation frequency based on the third driving state information, as illustrated in FIG. 5.

FIG. 10 is a diagram for illustrating a method of comparing a ratio of an external noise level to a driving noise level and a threshold ratio according to one or more embodiments of the disclosure.

According to one or more embodiments, the at least one processor 120 may drive the refrigerator 100 based on the first driving state information. For convenience of explanation, the first driving state information will be assumed as the driving state information 7 among the plurality of driving state information as illustrated in FIG. 10.

Also, according to one or more embodiments, the at least one processor 120 may drive the compressor in the stage 2 of the driving frequency, and drive the fan motor in the stage 1 of the rotation frequency based on the first driving state information as illustrated in FIG. 5.

Then, the at least one processor 120 may identify the first driving noise level corresponding to the first driving state information (e.g., 31 dB).

Then, when an ambient noise is received through the microphone, the at least one processor 120 may identify a reception noise level (e.g., 60 dB) based on the received ambient noise, and identify an external noise level (e.g., 29 dB (=60−31)) based on the reception noise level and the first driving noise level.

Then, if the ratio of the external noise level to the first driving noise level (e.g., the external noise level (29 dB)/the first driving noise level (31 dB)=0.94) is greater than or equal to the threshold ratio (e.g., 0.9), the at least one processor 120 may drive the refrigerator 100 based on the first driving state information. That is, in an ambient noise, a life noise is also an important factor other than a driving noise, and thus the driving noise does not have to be reduced, and accordingly, the at least one processor 120 may maintain the current driving state information. For example, as a ratio occupied by a life noise in an ambient noise is bigger than or similar to a ratio occupied by a driving noise, the user does not recognize the driving noise to be relatively bigger, and accordingly, the at least one processor 120 may maintain the current driving state information.

Figure 11:
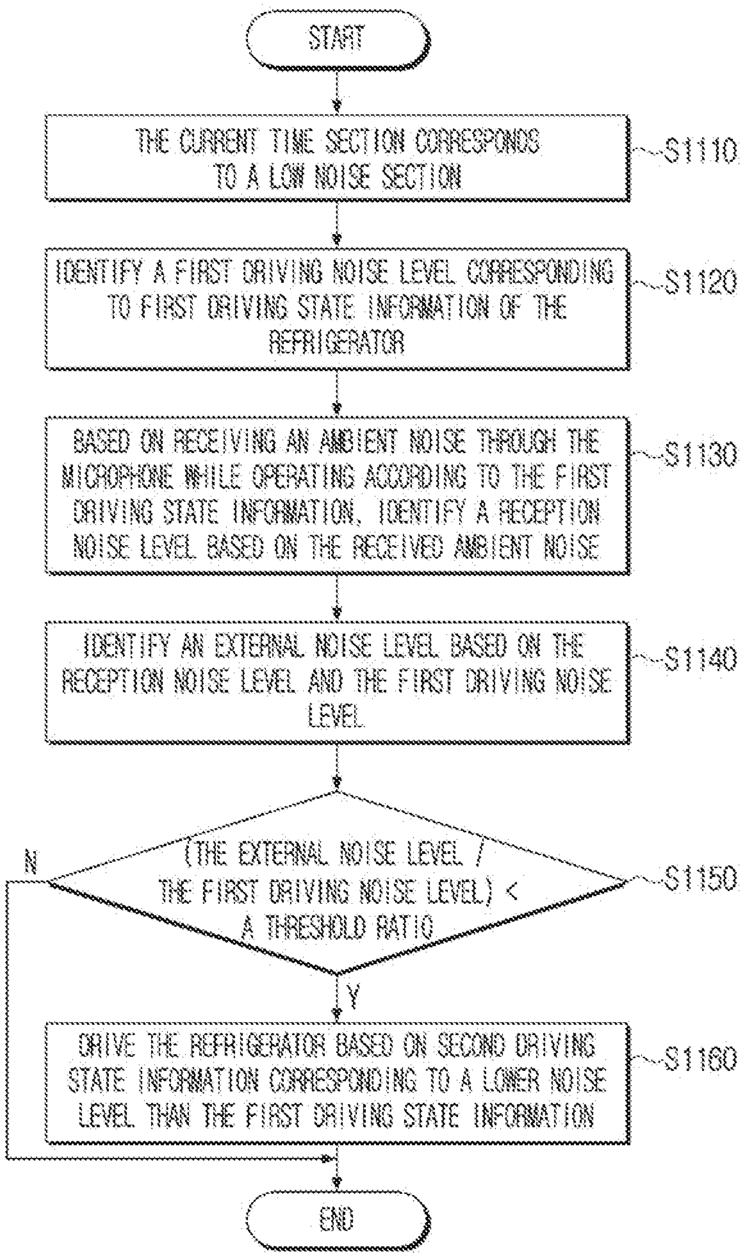
FIG. 11 is a flow chart for illustrating a method of controlling a refrigerator by comparing the current time section and a low noise section according to one or more embodiments of the disclosure.

FIG. 11 is a flow chart for illustrating a method of controlling a refrigerator by comparing the current time section and a low noise section according to one or more embodiments of the disclosure.

If the current time section corresponds to a low noise section (or, a low noise time section) in operation S1110, the at least one processor 120 according to one or more embodiments of the disclosure may perform the operation S1120, the operation S1130, the operation S1140, the operation S1150, and the operation S1160 illustrated in FIG. 11.

Here, the operation S1120, the operation S1130, the operation S1140, the operation S1150, and the operation S1160 are respectively identical to the operation S310, the operation S320, the operation S330, the operation S340, and the operation S350 illustrated in FIG. 3, and thus overlapping explanation will be omitted.

Hereinafter, a low noise section will be described.

Figure 12:
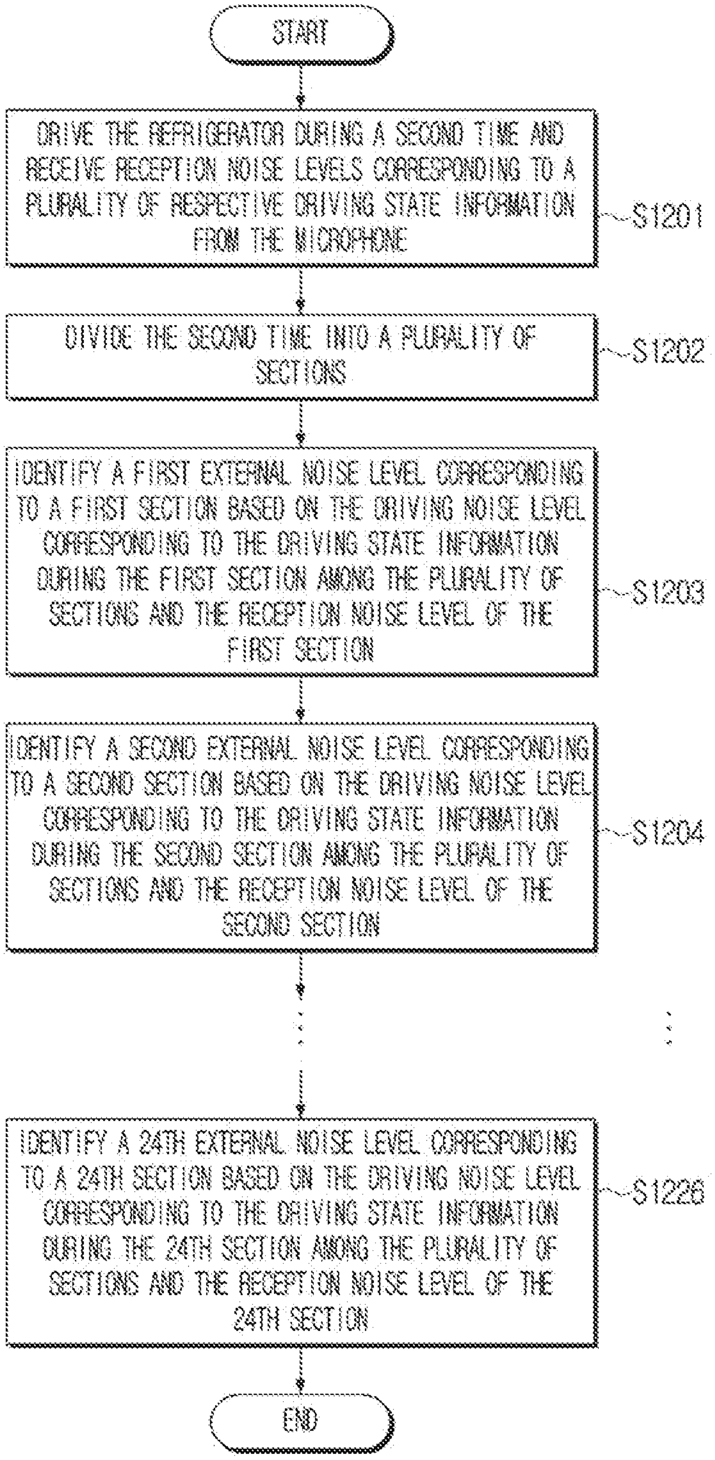
FIG. 12 is a flow chart for illustrating a method of identifying external noise levels corresponding to a plurality of respective sections according to one or more embodiments of the disclosure.

FIG. 12 is a flow chart for illustrating a method of identifying external noise levels corresponding to a plurality of respective sections according to one or more embodiments of the disclosure.

The at least one processor 120 according to one or more embodiments of the disclosure may drive the refrigerator 100 during the second time and receive reception noise levels corresponding to the plurality of respective driving state information from the microphone 110 in operation S1201.

Here, the second time is an example, and it may include a day (e.g., 24 hours). For convenience of explanation, the second time may be assumed as 24 hours.

Then, the at least one processor 120 may divide the second time into a plurality of sections in operation S1202. For example, the at least one processor 120 may divide 24 hours into each time zone. That is, the at least one processor 120 may divide 24 hours into 24 sections, which may be equal sections such that each of the 24 sections is 1 hour.

Then, the at least one processor 120 may identify a first external noise level corresponding to a first section based on the driving noise level corresponding to the driving state information during the first section among the plurality of sections and the reception noise level of the first section in operation S1203.

For example, the first section may include a time zone 0 (0:00-1:00) among the 24 sections. The at least one processor 120 according to one or more embodiments may identify a driving noise level (e.g., 10 dB (=25 dB−15 dB (reference value)) corresponding to the driving state information (e.g., the driving state information 3) of the refrigerator 100 in the first section, and identify the first external noise level (e.g., 29 dB=(39 dB−10 dB)) corresponding to the first section based on the difference between the reception noise level (e.g., 39 dB) and the driving noise level (e.g., 10 dB) of the first section.

Then, the at least one processor 120 may identify a second external noise level corresponding to a second section based on the driving noise level corresponding to the driving state information during the second section among the plurality of sections and the reception noise level of the second section in operation S1204.

For example, the second section may include a time zone 1 (1:00-2:00) among the 24 sections. The at least one processor 120 according to one or more embodiments may identify a driving noise level (e.g., 10 dB) corresponding to the driving state information (e.g., the driving state information 3) of the refrigerator 100 in the second section, and identify the second external noise level (e.g., 30 dB=(40 dB−10 dB)) corresponding to the second section based on the difference between the reception noise level (e.g., 40 dB) and the driving noise level (e.g., 10 dB) of the second section.

As described above, the at least one processor 120 may identify external noise levels corresponding to the plurality of respective sections. For example, the at least one processor 120 may identify a 24th external noise level corresponding to a 24th section based on the driving noise level corresponding to the driving state information during the 24th section (e.g., a time zone 23 (23:00-24:00)) among the plurality of sections and the reception noise level of the 24th section in operation S1226.

FIG. 13 is a diagram for illustrating a method of identifying a low noise section among a plurality of sections according to one or more embodiments of the disclosure.

The at least one processor 120 may identify external noise levels of the respective sections (the respective time zones) as illustrated in FIG. 13 by performing each step illustrated in the flow chart in FIG. 12.

Then, the at least one processor 120 may identify the lowest noise level among the external noise levels of the respective sections.

For example, if the external noise level of the first section (e.g., the time zone 0 (0:00-1:00)) is smaller than the external noise levels of the respective remaining sections (e.g., the time zone 1 to the time zone 23) as illustrated in FIG. 13, the at least one processor 120 may identify the external noise level of the first section (e.g., the time zone 0 (0:00-1:00)) as the lowest noise level.

Then, the at least one processor 120 may identify at least one section among the plurality of sections as a low noise section based on the lowest noise level.

For example, the at least one processor 120 may acquire a low noise reference level (e.g., 39 dB (=10+29)) by summing up a predetermined level (e.g., 10 dB) to the lowest noise level (e.g., 29 dB).

Then, the at least one processor 120 may identify at least one external noise level which is smaller than or equal to the low noise reference level among the external noise levels corresponding to the plurality of respective sections, and identify at least one section corresponding to the identified at least one external noise level among the plurality of sections as a low noise section.

For example, if the low noise reference level is 39 dB, the at least one processor 120 may identify an external noise level which is smaller than or equal to 39 dB among the external noise levels corresponding to the plurality of respective sections, and identify at least one section corresponding to the identified external noise level among the plurality of sections (e.g., the time zone 0 (0:00-1:00), the time zone 1 (1:00-2:00), the time zone 2 (2:00-3:00), the time zone 3 (3:00-4:00), the time zone 4 (4:00-5:00), the time zone 5 (5:00-6:00), the time zone 7 (7:00-8:00)) as a low noise section (or, a low noise time zone).

Then, after the second time passed (e.g., after a day passed), if the current time section corresponds to a low noise section in operation S1110, the at least one processor 120 may identify whether the ratio of the external noise level acquired in the current time section to the first driving noise level corresponding to the current driving state information is smaller than the threshold ratio in operation S1150. Then, if the ratio of the external noise level received in the current time section to the first driving noise level is smaller than the threshold ratio in operation S1150: Y, the at least one processor 120 may drive the refrigerator 100 based on driving state information (e.g., the second driving state information) corresponding to a lower noise level than the current driving state information (e.g., the first driving state information).

As another example, if the ratio of the external noise level received in the current time section to the first driving noise level is greater than or equal to the threshold ratio in operation S1150: N, the at least one processor 120 may drive the refrigerator 100 based on the current driving state information (e.g., the first driving state information).

Also, after the second time passed (e.g., after a day passed), if the current time section does not correspond to a low noise section, the at least one processor 120 may drive the refrigerator 100 based on the current driving state information (e.g., the first driving state information).

Figure 14:
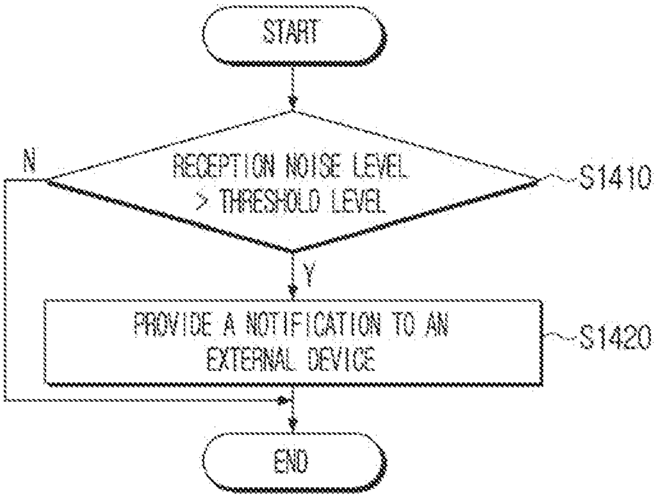
FIG. 14 is a diagram for illustrating a refrigerator receiving a reception noise level exceeding a threshold level according to one or more embodiments of the disclosure.

FIG. 14 is a diagram for illustrating a refrigerator receiving a reception noise level exceeding a threshold level according to one or more embodiments of the disclosure.

Referring to FIG. 14, if a reception noise level according to am ambient noise received through the microphone 110 exceeds a threshold level in operation S1410, the at least one processor 120 may provide a notification to an external device through the communication interface in operation S1420.

If a reception noise level acquired through the microphone 110 exceeds the threshold level and the current time section corresponds to a low noise section, the at least one processor 120 may provide a notification to an external device through the communication interface.

As another example, if a reception noise level acquired through the microphone 110 exceeds the threshold level but the current time section does not correspond to a low noise section, the at least one processor 120 may not provide a notification to an external device through the communication interface.

Here, the threshold level is an example, and it may include a big noise level greater than or equal to 90 dB which is a level that is difficult to be generated inside a home.

The communication interface receives inputs of various kinds of data. For example, the communication interface may communicate with an external device (e.g., a user terminal device), an external storage medium (e.g., a USB memory), an external server (e.g., a webhard), etc. through communication methods such as AP-based Wi-Fi (Wi-Fi, a wireless LAN network), Bluetooth, Zigbee, a wired/wireless local area network (LAN), a wide area network (WAN), an Ethernet, the IEEE 1394, a high-definition multimedia interface (HDMI), a universal serial bus (USB), a mobile high-definition link (MHL), the Audio Engineering Society/European Broadcasting Union (AES/EBU), Optical, Coaxial, etc.

The driving of the refrigerator 100 according to the flow chart illustrated in FIG. 4 is the driving of the refrigerator 100 on a t-2 time point, the driving of the refrigerator 100 according to the flow chart illustrated in FIG. 12 is the driving of the refrigerator 100 on a t-1 time point (e.g., a time point when the first time passed after the t-2 time point), and the driving of the refrigerator 100 according to the flow chart illustrated in FIG. 3 or FIG. 11 may include the driving of the refrigerator 100 on a t time point (e.g., a time point when the second time passed after the t-1 time point or the current time point).

That is, the refrigerator 100 according to one or more embodiments on the t-2 time point may perform each step illustrated in the flow chart in FIG. 4, and identify driving noise levels corresponding to the plurality of respective driving state information. Then, the refrigerator 100 according to one or more embodiments on the t-1 time point may perform each step illustrated in the flow chart in FIG. 12, and identify a low noise section among the plurality of sections. Then, the refrigerator 100 according to one or more embodiments on the t time point may perform each step illustrated in the flow chart in FIG. 11.

Figure 15:
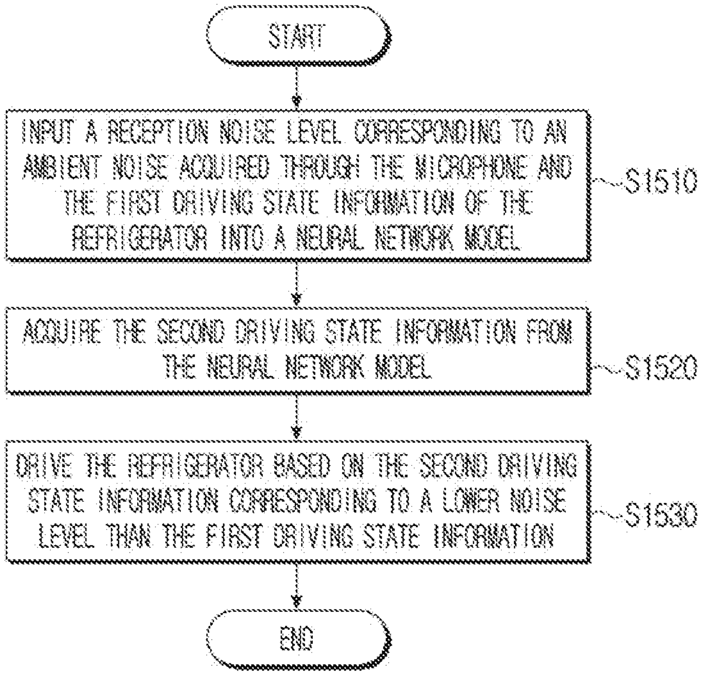
FIG. 15 is a flow chart for illustrating a method of acquiring driving state information by using a neural network model according to one or more embodiments of the disclosure.

FIG. 15 is a flow chart for illustrating a method of acquiring driving state information by using a neural network model according to one or more embodiments of the disclosure.

The at least one processor 120 according to one or more embodiments of the disclosure may input a reception noise level acquired through the microphone 110 and the first driving noise level corresponding to the first driving state information into a neural network model in operation S1510.

Then, the at least one processor 120 may acquire the second driving state information among the plurality of driving state information from the neural network model in operation S1520.

Then, the at least one processor 120 may drive the refrigerator 100 based on the second driving state information corresponding to a lower noise level than the first driving state information in operation S1530.

Here, the neural network model may be a model that is trained by using driving noise levels and reception noise levels corresponding to the plurality of respective driving state information as learning data, and outputs any one driving state information among the plurality of driving state information as output data.

For example, the neural network model may be trained to output any one driving state information among the plurality of driving state information as output data by using reception noise levels and driving noise levels corresponding to the plurality of respective driving state information that were acquired by performing each step illustrated in the flow chart in FIG. 4 as learning data.

Also, the neural network model may be trained to output any one driving state information corresponding to the current time section among the plurality of driving state information as output data by using reception noise levels and driving noise levels corresponding to the plurality of respective driving state information that were acquired by performing each step illustrated in the flow chart in FIG. 4, and external noise levels corresponding to the plurality of respective sections that were acquired by performing each step illustrated in the flow chart in FIG. 12 as learning data.

Functions related to artificial intelligence according to the disclosure are operated through the processor and the memory of the electronic device (e.g., the refrigerator 100). The processor may consist of one or a plurality of processors. Here, the one or plurality of processors may include at least one of a central processing unit (CPU), a graphic processing unit (GPU), or a neural processing unit (NPU), but the processors are not limited to the aforementioned examples of processors.

A CPU is a generic-purpose processor that can perform not only general operations but also artificial intelligence operations, and it can effectively execute a complex program through a multilayer cache structure. A CPU is advantageous for a serial processing method that enables a systemic linking between the previous calculation result and the next calculation result through sequential calculations. The generic-purpose processor is not limited to the aforementioned examples excluding cases wherein it is specified as the aforementioned CPU.

A GPU is a processor for mass operations such as a floating point operation used for graphic processing, etc., and it can perform mass operations in parallel by massively integrating cores. In particular, a GPU may be advantageous for a parallel processing method such as a convolution operation, etc. compared to a CPU. Also, a GPU may be used as a co-processor for supplementing the function of a CPU. A processor for mass operations is not limited to the aforementioned examples excluding cases wherein it is specified as the aforementioned GPU.

An NPU is a processor specialized for an artificial intelligence operation using an artificial neural network, and it can implement each layer constituting an artificial neural network as hardware (e.g., silicon). Here, the NPU is designed to be specialized according to the required specification of a company, and thus it has a lower degree of freedom compared to a CPU or a GPU, but it can effectively process an artificial intelligence operation required by the company. As the processor specialized for an artificial intelligence operation, an NPU may be implemented in various forms such as a tensor processing unit (TPU), an intelligence processing unit (IPU), a vision processing unit (VPU), etc. The artificial intelligence processor is not limited to the aforementioned examples excluding cases wherein it is specified as the aforementioned NPU.

Also, the one or plurality of processors may be implemented as a system on chip (SoC). Here, in the SoC, the memory, and a network interface such as a bus for data communication between the processor and the memory, etc. may be further included other than the one or plurality of processors.

In case the plurality of processors are included in the system on chip (SoC) included in the electronic device, the electronic device may perform an operation related to artificial intelligence (e.g., an operation related to learning or inference of the artificial intelligence model) by using some processors among the plurality of processors. For example, the electronic device may perform an operation related to artificial intelligence by using at least one of a GPU, an NPU, a VPU, a TPU, or a hardware accelerator specified for artificial intelligence operations such as a convolution operation, a matrix product operation, etc. among the plurality of processors. However, this is merely an example, and the electronic device can obviously process an operation related to artificial intelligence by using the generic-purpose processor such as a CPU, etc.

Also, the electronic device may perform operations related to artificial intelligence by using a multicore (e.g., a dual core, a quad core, etc.) included in one processor. In particular, the electronic device may perform artificial intelligence operations such as a convolution operation, a matrix product operation, etc. in parallel by using the multicore included in the processor.

The one or plurality of processors perform control to process input data according to predefined operation rules or an artificial intelligence model stored in the memory. The predefined operation rules or the artificial intelligence model are characterized in that they are made through learning.

Here, being made through learning means that a learning algorithm is applied to a plurality of learning data, and predefined operation rules or an artificial intelligence model having desired characteristics are thereby made. Such learning may be performed in a device itself wherein artificial intelligence is performed according to the disclosure, or performed through a separate server/system.

The artificial intelligence model may consist of a plurality of neural network layers. At least one layer has at least one weight value, and performs an operation of the layer through the operation result of the previous layer and at least one defined operation. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN) and deep Q-networks, and a Transformer, but the neural network in the disclosure is not limited to the aforementioned examples excluding specified cases.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

According to one or more embodiments, the memory may store information on an artificial intelligence model including a plurality of layers. Here, storing information on an artificial intelligence model may mean storing various information related to operations of the artificial intelligence model, e.g., information on a plurality of layers included in the artificial intelligence model, information on parameters (e.g., a filter coefficient, a bias, etc.) used respectively in the plurality of layers, etc.

The memory may store data necessary for the various embodiments of the disclosure. The memory may be implemented in the form of a memory embedded in the refrigerator 100, or implemented in the form of a memory that can be attached to or detached from the refrigerator 100, according to the usage of stored data.

For example, in the case of data for operating the refrigerator 100, the data may be stored in a memory embedded in the refrigerator 100, and in the case of data for an extended function of the refrigerator 100, the data may be stored in a memory that can be attached to or detached from the refrigerator 100. In the case of a memory embedded in the refrigerator 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the refrigerator 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

According to one or more embodiments, the memory may store at least one instruction or a computer program including instructions for controlling the refrigerator 100.

A control method of a refrigerator according to one or more embodiments of the disclosure includes the steps of identifying a first driving noise level corresponding to first driving state information of the refrigerator, based on receiving an ambient noise while operating according to the first driving state information, identifying a reception noise level based on the received ambient noise, identifying an external noise level based on the reception noise level and the first driving noise level, and based on the ratio of the external noise level to the first driving noise level being smaller than a threshold ratio, driving the refrigerator based on second driving state information corresponding to a lower noise level than the first driving state information.

Here, the first driving state information may correspond to a first driving frequency of a compressor provided on the refrigerator and a first rotation frequency of a fan motor provided on the refrigerator, and the step of driving the refrigerator may include the step of adjusting at least one of the first driving frequency or the first rotation frequency to a low frequency based on the second driving state information.

According to one or more embodiments, the step of driving the refrigerator may include the step of inputting the reception noise level and the first driving noise level into a neural network model and acquiring the second driving state information among a plurality of driving state information. Also, the neural network model may be a model trained to output any one driving state information among the plurality of driving state information based on driving noise levels and reception noise levels corresponding to the plurality of respective driving state information.

The control method according to one or more embodiments may further include the steps of driving the refrigerator during a first time and receiving reception noise levels corresponding to a plurality of respective driving state information, acquiring driving noise levels corresponding to the plurality of respective driving state information based on the plurality of reception noise levels received during the first time, and allotting noise levels to the plurality of respective driving state information according to the sizes of the plurality of respective driving noise levels.

Here, the step of acquiring the driving noise levels corresponding to the plurality of respective driving state information may include the step of acquiring the driving noise levels corresponding to the plurality of respective driving state information based on an average level of the reception noise levels corresponding to the plurality of respective driving state information.

The control method according to one or more embodiments of the disclosure may further include the steps of driving the refrigerator during a second time and receiving reception noise levels corresponding to a plurality of respective driving state information, dividing the second time into a plurality of sections, identifying a first external noise level corresponding to the first section based on a driving noise level corresponding to driving state information during a first section among the plurality of sections and a reception noise level of the first section, and identifying a second external noise level corresponding to the second section based on a driving noise level corresponding to driving state information during a second section among the plurality of sections and a reception noise level of the second section.

Here, the control method according to one or more embodiments may further include the steps of identifying external noise levels corresponding to the plurality of respective sections, identifying the lowest noise level among the plurality of external noise levels, and identifying at least one section among the plurality of sections as a low noise section based on the lowest noise level.

Here, the control method according to one or more embodiments may further include the steps of identifying whether the current time section corresponds to the low noise section, and based on the current time section not corresponding to the low noise section, driving the refrigerator based on the first driving state information, and the step of driving the refrigerator based on the second driving state information may include the steps of, based on the current time section corresponding to the low noise section, identifying whether the ratio of the external noise level to the first driving noise level is smaller than a threshold ratio, and based on the ratio of the external noise level to the first driving noise level being smaller than the threshold ratio, driving the refrigerator based on the second driving state information.

The control method according to one or more embodiments may further include the step of, based on the reception noise level according to the received ambient noise exceeding a threshold level, providing a notification to an external device.

The control method according to one or more embodiments of the disclosure may further include the steps of identifying a second driving noise level corresponding to the second driving state information, and based on the ratio of the external noise level to the second driving noise level being smaller than a threshold ratio, driving the refrigerator based on third driving state information corresponding to a lower noise level than the second driving noise level.

The various embodiments of the disclosure can not only be applied to a refrigerator, but can also be applied to various types of electronic devices including a microphone.

The aforementioned various embodiments may be implemented in a recording medium that can be read by a computer or a device similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Computer instructions for performing processing operations of the electronic device 100 according to the aforementioned various embodiments of the disclosure may be stored in a non-transitory computer-readable medium. Computer instructions stored in such a non-transitory computer-readable medium make the processing operations at the refrigerator 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disk, a blue-ray disk, a USB, a memory card, a ROM and the like.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A refrigerator comprising:
- a microphone; and
- at least one processor configured to:
  - identify a first driving noise level corresponding to first driving state information of the refrigerator,
  - based on receiving an ambient noise through the microphone while operating according to the first driving state information, identify a reception noise level based on the ambient noise,
  - identify an external noise level based on the reception noise level and the first driving noise level, and
  - based on a ratio of the external noise level to the first driving noise level being smaller than a threshold ratio, drive the refrigerator based on second driving state information corresponding to a lower noise level than the first driving state information.

2. The refrigerator of claim 1, further comprising:
- a compressor; and
- a fan motor,
- wherein the first driving state information corresponds to a first driving frequency of the compressor and a first rotation frequency of the fan motor, and
- wherein the at least one processor is further configured to:
  - adjust at least one of the first driving frequency or the first rotation frequency to a low frequency based on the second driving state information, the low frequency being lower than the at least one of the first driving frequency and the first rotation frequency.

3. The refrigerator of claim 1, wherein the at least one processor is further configured to input the reception noise level and the first driving noise level into a neural network model and acquire the second driving state information among a plurality of driving state information, and
- wherein the neural network model is a model trained to output any one driving state information among the plurality of driving state information based on driving noise levels and reception noise levels corresponding to the plurality of respective driving state information.

4. The refrigerator of claim 1, wherein the at least one processor is further configured to:
- drive the refrigerator during a first time and receive a plurality of reception noise levels corresponding to a plurality of respective driving state information,
- acquire driving noise levels corresponding to the plurality of respective driving state information based on the plurality of reception noise levels acquired through the microphone during the first time, and
- allot noise levels to the plurality of respective driving state information according to sizes of the plurality of respective driving noise levels.

5. The refrigerator of claim 4, wherein the at least one processor is further configured to:
- acquire the driving noise levels corresponding to the plurality of respective driving state information based on an average level of reception noise levels corresponding to the plurality of respective driving state information.

6. The refrigerator of claim 1, wherein the at least one processor is further configured to:
- drive the refrigerator during a second time and receive reception noise levels corresponding to a plurality of respective driving state information through the microphone,
- divide the second time into a plurality of sections comprising a first section and a second section,
- identify a first external noise level corresponding to the first section based on a driving noise level, corresponding to driving state information during the first section, and a first reception noise level of the first section, and
- identify a second external noise level corresponding to the second section based on a driving noise level, corresponding to driving state information during the second section, and a second reception noise level of the second section.

7. The refrigerator of claim 6, wherein the at least one processor is further configured to:
- identify a plurality of external noise levels corresponding to the plurality of respective sections,
- identify a lowest noise level among the plurality of external noise levels, and
- identify at least one section among the plurality of sections as a low noise section based on the lowest noise level.

8. The refrigerator of claim 7, wherein the at least one processor is further configured to:
- based on a current time section corresponding to the low noise section, identify whether the ratio of the external noise level to the first driving noise level is smaller than the threshold ratio,
- based on the ratio of the external noise level to the first driving noise level being smaller than the threshold ratio, drive the refrigerator based on the second driving state information, and
- based on the current time section not corresponding to the low noise section, drive the refrigerator based on the first driving state information.

9. The refrigerator of claim 1, further comprising:
- a communication interface,
- wherein the at least one processor is further configured to, based on the reception noise level according to the ambient noise received through the microphone exceeding a threshold level, provide a notification to an external device through the communication interface.

10. The refrigerator of claim 1, wherein the at least one processor is further configured to:
- identify a second driving noise level corresponding to the second driving state information, and based on a ratio of the external noise level to the second driving noise level being smaller than the threshold ratio, drive the refrigerator based on third driving state information corresponding to a second lower noise level that is lower than the second driving noise level.

11. A control method of a refrigerator, the control method comprising:

identifying a first driving noise level corresponding to first driving state information of the refrigerator;

based on receiving an ambient noise through a microphone of the refrigerator while operating according to the first driving state information, identifying a reception noise level based on the ambient noise;

identifying an external noise level based on the reception noise level and the first driving noise level; and based on a ratio of the external noise level to the first driving noise level as being smaller than a threshold ratio, driving the refrigerator based on second driving state information corresponding to a lower noise level than the first driving state information.

12. The control method of claim 11, wherein the first driving state information corresponds to a first driving frequency, of a compressor provided on the refrigerator, and a first rotation frequency of a fan motor provided on the refrigerator, and wherein the driving the refrigerator comprises adjusting at least one of the first driving frequency or the first rotation frequency to a low frequency based on the second driving state information, the low frequency being lower than the at least one of the first driving frequency and the first rotation frequency.

13. The control method of claim 11, wherein the driving the refrigerator comprises inputting the reception noise level and the first driving noise level into a neural network model and acquiring the second driving state information among a plurality of driving state information, and wherein the neural network model is a model trained to output any one driving state information among the plurality of driving state information based on driving noise levels and reception noise levels corresponding to the plurality of respective driving state information.

14. The control method of claim 11, further comprising:

driving the refrigerator during a first time and receiving a plurality of reception noise levels corresponding to a plurality of respective driving state information;

acquiring driving noise levels corresponding to the plurality of respective driving state information based on the plurality of reception noise levels received during the first time; and allotting noise levels to the plurality of respective driving state information according to sizes of the plurality of respective driving noise levels.

15. The control method of claim 14, wherein the acquiring the driving noise levels corresponding to the plurality of respective driving state information comprises acquiring the driving noise levels corresponding to the plurality of respective driving state information based on an average level of reception noise levels corresponding to the plurality of respective driving state information.

16. The control method of claim 11, further comprising:

receiving reception noise levels corresponding to a plurality of respective driving state by driving the refrigerator during a second time;

dividing the second time into a plurality of sections comprising a first section and a second section;

identifying a first external noise level corresponding to the first section based on a driving noise level, corresponding to driving state information during the first section, and a first reception noise level of the first section; and identifying a second external noise level corresponding to the second section based on a driving noise level, corresponding to driving state information during the second section, and a second reception noise level of the second section.

17. The control method of claim 16, further comprising:

identifying a plurality of external noise levels corresponding to the plurality of respective sections;

identifying a lowest noise level among the plurality of external noise levels; and identifying at least one section among the plurality of sections as a low noise section based on the lowest noise level.

18. The control method of claim 17, further comprising:

identifying whether a current time section corresponds to the low noise section;

based on the current time section not corresponding to the low noise section, driving the refrigerator based on the first driving state information;

wherein the driving the refrigerator based on the second driving state information comprises:

based on the current time section corresponding to the low noise section, identifying whether the ratio of the external noise level to the first driving noise level is smaller than the threshold ratio, based on the ratio of the external noise level to the first driving noise level being smaller than the threshold ratio, driving the refrigerator based on the second driving state information.

19. The control method of claim 11, further comprising:

based on the reception noise level according to the ambient noise exceeding a threshold level, providing a notification to an external device.

20. A non-transitory computer-readable recording medium including a program executing a control method of a refrigerator, the control method comprising:

identifying a first driving noise level corresponding to first driving state information of the refrigerator;

based on receiving an ambient noise through a microphone of the refrigerator while operating according to the first driving state information, identifying a reception noise level based on the ambient noise;

identifying an external noise level based on the reception noise level and the first driving noise level; and based on a ratio of the external noise level to the first driving noise level as being smaller than a threshold ratio, driving the refrigerator based on second driving state information corresponding to a lower noise level than the first driving state information.

* * * * *